United States Patent

Hasegawa

[11] Patent Number: 6,122,088
[45] Date of Patent: Sep. 19, 2000

[54] ULTRA-HIGH SPEED LIGHT TRANSMISSION METHOD MAKING USE OF QUASI-SOLITONS IN FIBERS

[75] Inventor: Akira Hasegawa, Kyoto, Japan

[73] Assignee: Japan Science and Technology Corporation, Japan

[21] Appl. No.: 08/984,527

[22] Filed: Dec. 3, 1997

[30] Foreign Application Priority Data

Dec. 9, 1996 [JP] Japan ..................................... 8-328833

[51] Int. Cl.[7] ........................... H04B 10/04; H04B 10/12
[52] U.S. Cl. ......................... 359/188; 359/161; 359/173; 359/179
[58] Field of Search .................... 359/161, 173, 359/179, 188

[56] References Cited

U.S. PATENT DOCUMENTS

| 5,508,845 | 4/1996 | Frisken ..................................... 359/161 |
| 5,606,445 | 2/1997 | Kikuchi et al. ........................... 359/161 |

OTHER PUBLICATIONS

"Reduction of the dispersive wave in periodically amplified links with initially chirped solition", Photon. Techn. Lett., vol. 9, 127 (1997), Gerges et al.

Opt. Lett. 21, 555 (1996), J.D. Moores

Opt. Comm. 117, 65 (1995), Belanger et al.

Optical Fiber Communications, Suzuki et al, Opt. Soc. Am. Washington, D.C. Paper DPD20 (1995).

IEEE J. Quantum Electron, QE–31, 591 (1995) Haus et al.

J. Lightwave Technol. 1995, LT–13 1995 Knox et al.

Electron. Lett. 32, 54 (1996), Smith et al.

*Primary Examiner*—Leslie Pascal
*Assistant Examiner*—Vu T. Lieu
*Attorney, Agent, or Firm*—Lurusso & Loud

[57] ABSTRACT

There is disclosed a super-high speed light transmission method making use of quasi-solitons in a fiber. Chirped stationary pulses are transmitted through the fiber. At a position where the effect of the chirp becomes weak and the sign of the chirp reverses, the sign of the chirp is reversed by a dispersion compensation fiber or fiber grating connected to the fiber in order to recover the initial chirp. The dispersion profile of each of the fibers is properly controlled in order to produce stationary quasi-solitons having a stable pulse shape. The method can prevent widening of pulses, which would otherwise occur due to dispersion.

4 Claims, 5 Drawing Sheets

ULTRA-HIGH SPEED LIGHT TRANSMISSION METHOD MAKING USE OF QUASI-SOLITONS IN FIBERS

BACKGROUND OF THE INVENTION

1. Field of the Invention

The present invention relates to a method for ultra-high speed optical transmission making use of quasi-solitons in fibers.

2. Description of the Related Art

The following is literature related to studies on optical soliton communications.

(1) M. Suziki, I. Morita, S. Yamamoto, N. Edagawa, H. Taga and S. Akiba, Optical Fiber Communications (OFC'95), Opt. Soc. Am., Washington D.C., Paper PD20 (1995).

(2) H. A. Haus, K. Tamura, L. E. Nelson and E. P. Ippen, IEEE J. Quantum Election. QE-31, 591 (1995).

(3) F. M. Knox, W. Forysiak and N. J. Doran, J. Lightwave Technol. LT-13 1955 (1995).

(4) N. J. Smith, F. M. Knox, N. J. Doran, K. J. Blow and I. Bennion, Electron. Lett. 32, 54 (1996).

This literature reports formation of a stable soliton-like Gaussian pulse through an increase in power.

(5) T. Georges and B. Charbonnier, "Reduction of the dispersive wave in periodically amplified links with initially chirped solitons", submitted to Photon. Techn. Lett.

According to this literature, when pre-chirping is applied to soliton input to fibers composed of positive dispersion fibers and negative dispersion fibers connected alternately, generation of dispersive wave and interaction between solitons are suppressed.

(6) J. D. Moores, Opt. Lett. 21, 555 (1996).

(7) P. A. Belanger and N. Belanger, Opt. Comm. 117, 56 (1995).

According to this literature, when a pulse is subjected to chirping, the pulse contracts.

As described above, extensive studies have been conducted in relation to optical soliton communications, which have excellent characteristics, such as the capability of forming stable and stationary localized pulses. In conventional soliton communications, group velocity dispersion of pulses in the fibers is compensated by making use of the non-linear effect caused by the Kerr effect.

Figure 1:
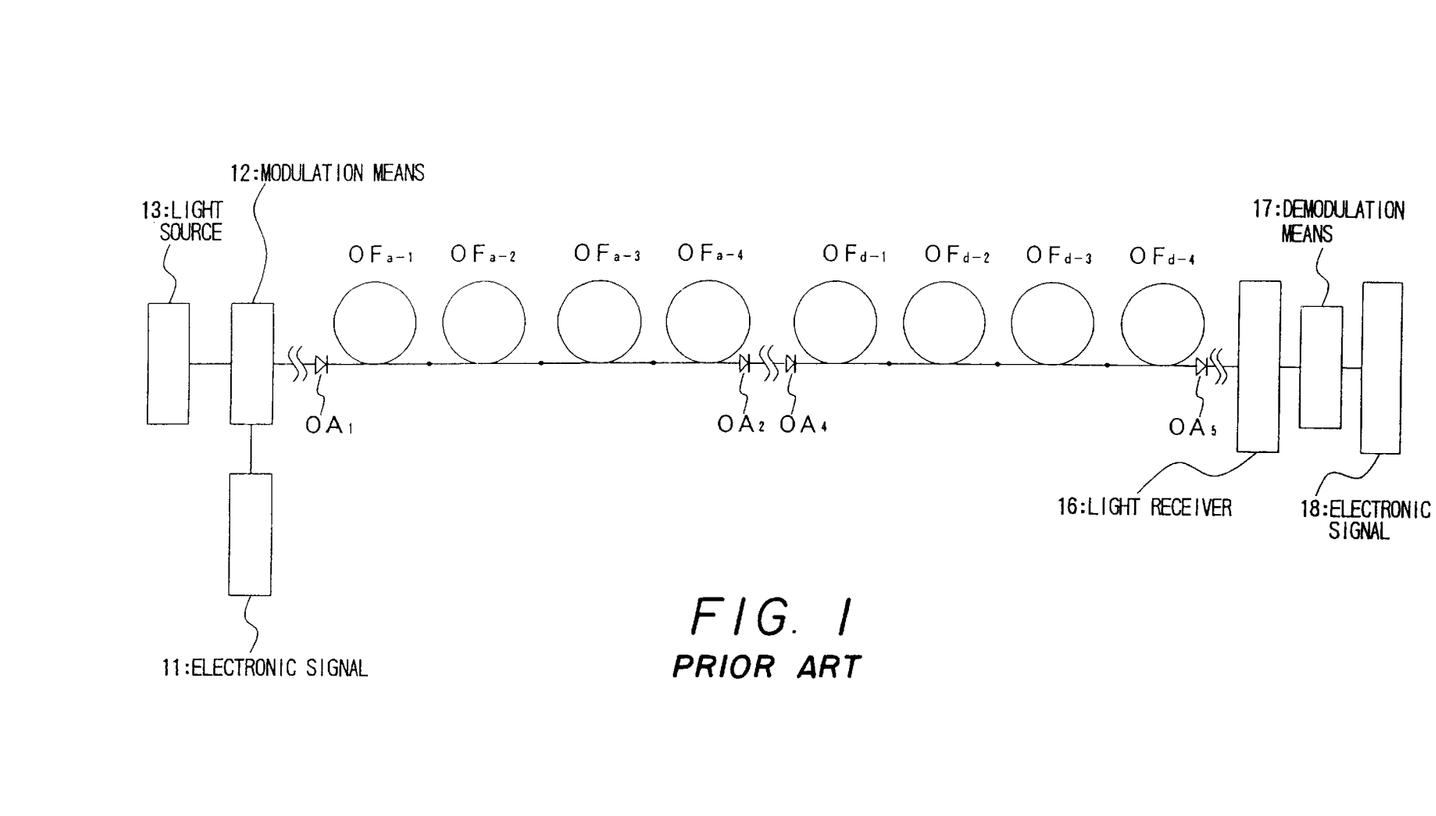
FIG. 1 is an explanatory diagram showing a conventional soliton transmission scheme.

FIG. 1 shows a conventional soliton transmission scheme.

As shown in FIG. 1, light from a light source 13 is modulated by modulation means 12 in accordance with an electronic signal 11, so that solitons are generated from the modulation means 12. After being amplified by an optical amplifier $OA_1$, the solitons are transmitted through optical fibers $OF_{a-1}$, $OF_{a-2}$, $OF_{a-3}$, and $OF_{a-4}$ having varying dispersions and constituting a first fiber section. The solitons are then transmitted successively through second and third fiber sections, and enter an optical amplifier $OA_4$ in which the solitons are amplified. Subsequently, the solitons are transmitted through optical fibers $OF_{d-1}$, $OF_{d-2}$, $OF_{d-3}$, and $OF_{d-4}$ having varying dispersions and constituting a fourth fiber section. The solitons are then passed through an optical amplifier $OA_5$ and are received by a light receiver 16. The received solitons are demodulated by demodulation means 17 so as to yield an electronic signal 18 corresponding to the original electronic signal 11.

Figure 2:
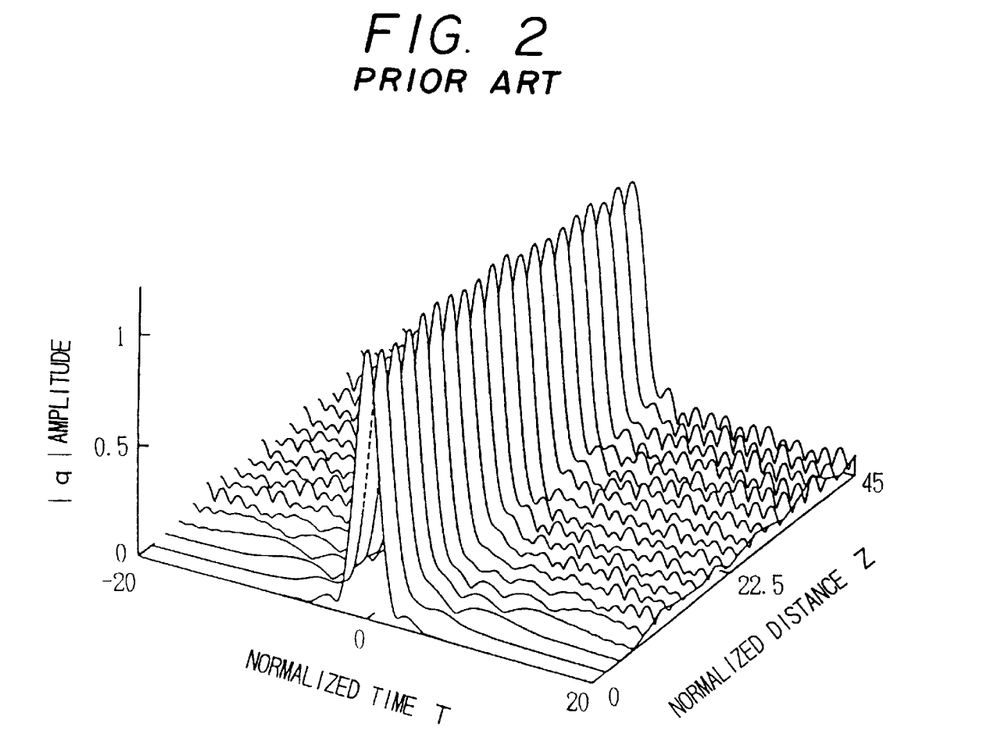
FIG. 2 is a diagram showing the shape of a pulse transmitted by the conventional soliton transmission scheme.

However, as shown in FIG. 2, in the above-described conventional optical soliton communications scheme, each pulse has a shape defined by a hyperbolic function and has a long skirt, resulting in a problem of proneness to interaction with an adjacent pulses.

The conventional scheme has another problem that when pulse width is decreased to 10 picoseconds or less, peak power exceeds 10 mW.

SUMMARY OF THE INVENTION

An object of the present invention is to provide an ultra-high speed optical transmission method making use of quasi-solitons in fibers, which method can prevent widening of pulses that would otherwise occur due to dispersion.

To achieve the above object, the present invention provides an ultra-high speed optical transmission method making use of quasi-solitons in fibers, in which the dispersion of a fiber is changed into a predetermined profile, and pulses characterized by chirping (effect in which the frequency varies within each pulse) are transmitted through the fiber, so that an equivalent potential created by the chirping reinforces the soliton effect in order to cause pulses to have a pulse shape that is stationary or substantially stationary.

The dispersion profile of the optical fiber is properly controlled such that each pulse has a stable and stationary shape.

The effect of the chirping becomes weaker with increasing transmission distance, and when the transmission distance exceeds a predetermined distance, the sign of the chirp is reversed. Therefore, a fiber having a reversed profile in terms of group velocity dispersion (dispersion compensation fiber) is connected to the optical fiber in order to restore the original chirp. The degree of chirping exerted on each input pulse depends on the location on the fiber having a varying dispersion at which the input pulse is injected. For example, when pulses are injected at a position where the sign of the chirp reverses, pulses without chirp are injected. However, even in such a case, the chirp is naturally generated, and the above-described object is attained.

Figure 7:
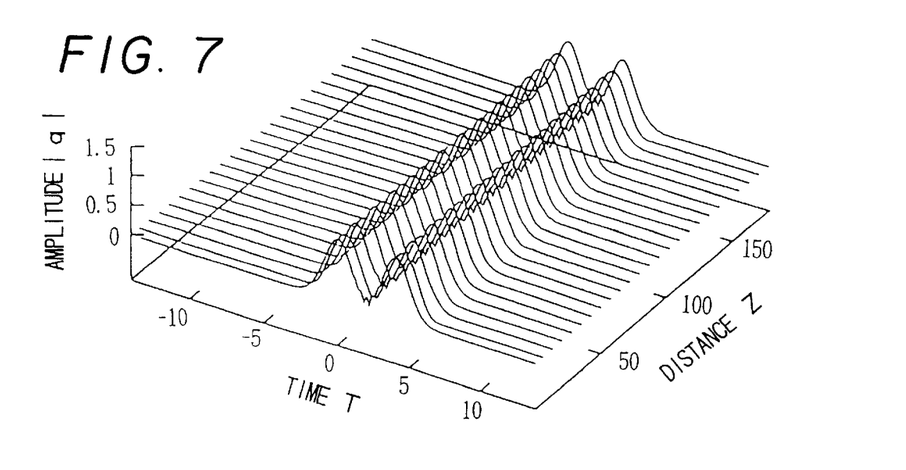
FIG. 7 relates to the embodiment of the present invention and shows the result of a simulation in which interaction between two quasi-solitons was simulated.

As shown in FIG. 7, the thus-formed pulses (quasi-solitons) have a shape close to the shape of Gaussian pulses, which is different from that of ordinary solitons. Therefore, interference between pulses can be easily suppressed, and even when the pulse width is decreased to 10 picoseconds, peak power can be suppressed to a level as low as 6 mW. Accordingly, large capacity communications over an ultra-long distance are enabled.

A transmission of pulses each having a pulse width of 4.14 ps and an inter-pulse period of 11 ps was simulated. The results of the simulation demonstrate that pulses can be transmitted a distance of 3000 km or more without problems.

In contrast, when conventional solitons are transmitted under the same conditions, collision occurs between adjacent solitons when the solitons are transmitted a distance of 80 km.

DESCRIPTION OF THE PREFERRED EMBODIMENTS

Embodiments of the present invention will now be described below in detail.

Figure 3:
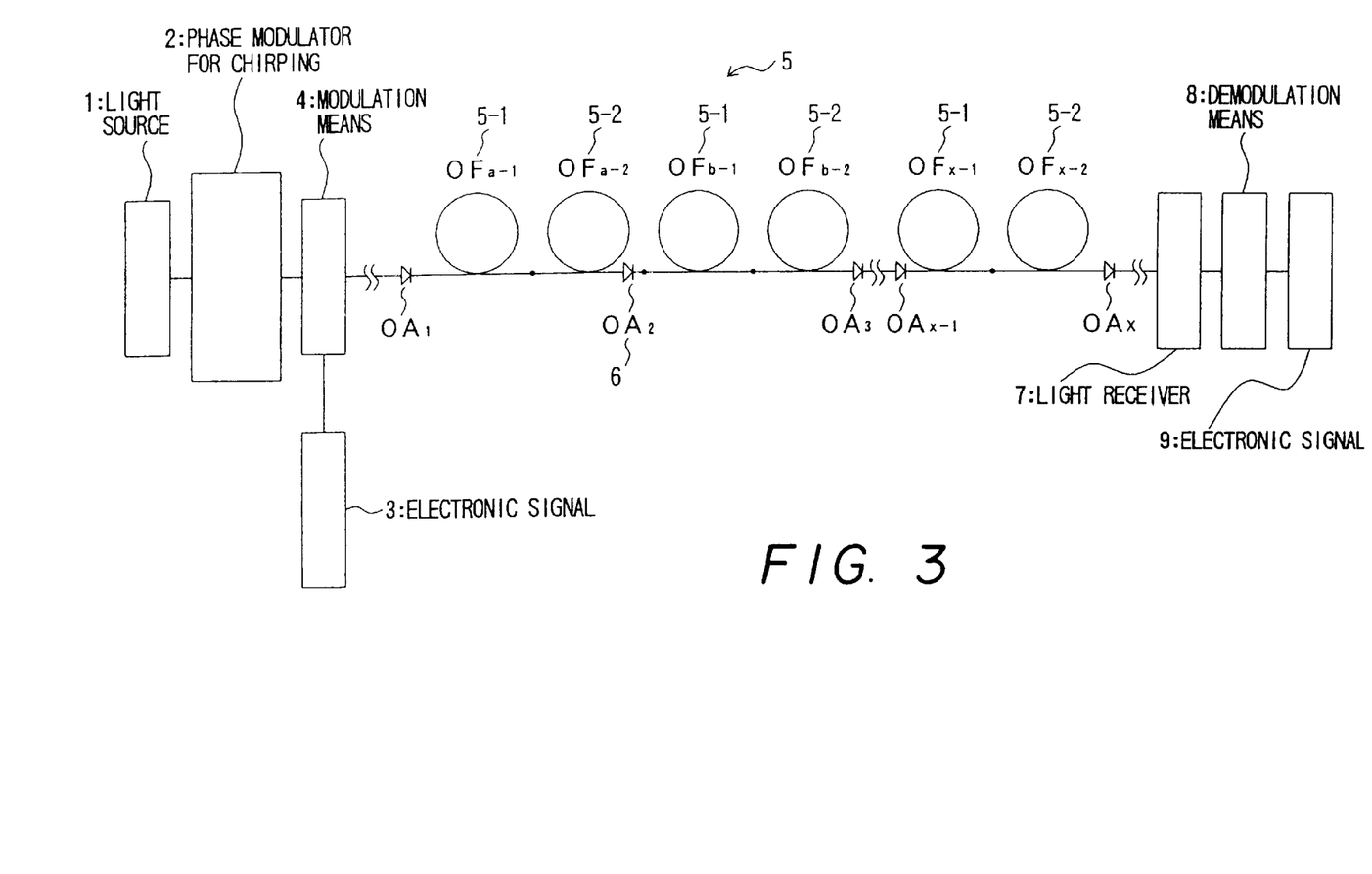
FIG. 3 is a diagram showing a soliton transmission scheme according to an embodiment of the present invention in which quasi-solitons in fibers are utilized.

FIG. 3 is a diagram showing a soliton transmission scheme according to an embodiment of the present invention in which quasi-solitons in fibers are utilized.

In FIG. 3, numeral 1 denotes a light source, numeral 2 denotes a phase modulator for generation of chirp, numeral 3 denotes an electronic signal, numeral 4 denotes modulation means, and numeral 5 denotes a fiber cable. The fiber cable 5 is composed of dispersion-profile managed fiber 5-1 and dispersion compensation fiber 5-2. Numeral 6 ($OA_1$–$OA_x$) denotes optical amplifiers, numeral 7 denotes a light receiver, numeral 8 denotes demodulation means, and numeral 9 denotes an electronic signal.

Light from the light source 1 is introduced to the phase modulator 2 in which a chirp is added to the light. The light is then modulated by the modulation means 4 in accordance with the electronic signal 3 to be transmitted, so that solitons are radiated from the modulation means 4. After being amplified by optical amplifier $OA_1$, the solitons are transmitted through a first fiber section composed of a dispersion-profile managed fiber 5-1 ($OF_{a-1}$) and a dispersion compensation fiber 5-2 ($OF_{a-2}$), and then amplified by optical amplifier $OA_2$. Subsequently, the solitons are transmitted through a second fiber section composed of dispersion-profile managed fiber 5-1 ($OF_{b-1}$) and dispersion compensation fiber 5-2 ($OF_{b-2}$), and are then amplified by optical amplifier $OA_3$. In this way, the solitons are further transmitted through a third fiber section to an xth (or final) fiber section composed of dispersion-profile managed fiber 5-1 ($OF_{x-1}$) and dispersion compensation fiber 5-2 ($OF_{x-2}$). The thus-transmitted solitons are amplified by optical amplifier $OA_x$ and received by the light receiver 7. The received solitons are demodulated by a demodulator 8 so as to obtain an electronic signal 9 corresponding to the original electronic signal 3. Thus, transmitted data are obtained. When the pulses are input to the fiber 5-1 at a location where the chirp becomes zero, the input pulses are not required to undergo phase modulation.

That is, the dispersion profile of a fiber having an anomalous dispersion as described in the above-described Reference 5 is changed properly in order to obtain a stationary localized mode.

The stationary mode varies in functional shape from secant-hyperbolic to Gaussian [$\exp(t^2)$], depending on the input power.

Consequently, this stationary localized mode is called "quasi-soliton."

First, propagation in an anomalous dispersion fiber having a length $Z_1$ is considered. The complex amplitude q of a light wave in a fiber having a dispersion d(Z) that varies along the longitudinal direction is described by the nonlinear Schrodinger (NLS) equation, $$i\frac{\partial q}{\partial Z} + \frac{d(Z)}{2}\frac{\partial^2 q}{\partial T_2} + \alpha|q|^2 q = -i\Gamma q, \text{ for } 0 \le Z \le Z_1 \quad (1)$$

where Γ represents the normalized fiber loss and α is the normalized nonlinear coefficient. Oscillations in amplitude due to fiber loss and amplifiers can be eliminated by introducing a new amplitude u, with q=a(Z)u and a(Z)=exp(-ΓZ). Here, u satisfies the following equation:

$$i\frac{du}{dZ'} + \frac{d_e(Z')}{2}\frac{\partial^2 q}{\partial T_2} + \alpha|u|^2 u = 0, \quad (2)$$

where $$Z'=\int_0^z a^2(Z)dZ, \text{ and } d_e(Z')=d(Z)/a^2(Z). \quad (3)$$

Now, a stationary (Z'-independent) localized solution is obtained through assumption of a pulse having a chirped amplitude u represented by the following equation:

$$u=\sqrt{p(Z')}v(p(Z')T,Z')\exp[iC(Z')T_2/2], \quad (4)$$

where p and C are real function of Z'. Substituting Eq.(4) in Eq.(2), we obtain:

$$i\left[\frac{\partial v}{\partial Z'} + K_0\gamma\frac{\partial v}{\partial \gamma}\right] + \frac{d_e p^2}{2}\frac{\partial^2 v}{\partial \gamma^2} + \alpha p|v|^2 v = \frac{K_1\gamma^2 p}{2}v - i\frac{K_0}{2}v, \quad (5)$$

where $$K_0 = \frac{\dot{p} + Cd_e p}{p}, \quad K_1 = \frac{\dot{C} + C^2 d_e}{p^3}. \quad (6)$$

Here, "." denotes differentiation with respect to the argument and γ=pT. The dispersion profile of the fiber is determined such that $K_0=0$ and $K_1$ is constant. Then, v satisfies $$i\frac{\partial v}{\partial Z'} + \frac{d_e p^2}{2}\frac{\partial^2 v}{\partial \gamma^2} + \alpha p|v|^2 v = \frac{K_1\gamma^2 p}{2}v. \quad (7)$$

If $d_e p^2$ p and $K_1=0$, Eq.(7) yields the ideal NLS equation for v.

Therefore, the constraint $$d_e p=\text{const}(=1) \quad (8)$$

is introduced in Eq.(7) to yield $$i\frac{\partial v}{\partial Z''} + \frac{1}{2}\frac{\partial^2 v}{\partial \gamma^2} + \left[\alpha|v|^2 - \frac{K_1\gamma^2}{2}\right]v = 0, \quad (9)$$

where $Z''=\int_0^Z p(s)ds$.

v can be interpreted as the wave function of a quasi particle trapped by the potential $|v|^2$ created itself and the potential $K_1\gamma^2$ created by the chirp.

If α=0, Eq.(9) represents the wave equation for the linear harmonic oscillator, while if $K_1=0$, Eq.(9) yields the ideal NLS equation.

The stationary solutions of Eq.(9) can be obtained by setting $$v = f(\gamma)\exp[iK_2 Z''] \quad (10)$$

to yield $$\frac{1}{2}\frac{d^2 f}{d\gamma^2} + \alpha f^3 - K_2 f - (K_1/2)\gamma^2 f = 0. \quad (11)$$

Eq.(11) is solved numerically.

Figure 4:
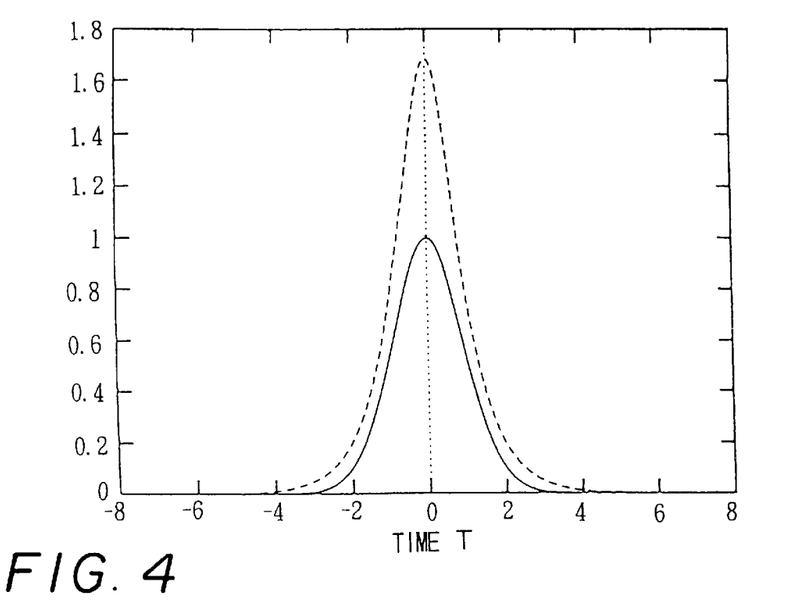
FIG. 4 is a plot related to the embodiment of the present invention, showing a solution for the case where $\alpha=1$ and $K_1=1$ (solid line), and a soliton solution $(\eta/\sqrt{\alpha})\text{sech}(\eta T)$ for pulses having the same pulse width (broken line)

The solid line in FIG. 4 represents a solution for the case where $\alpha=0.5$ and $K_1=1$, and the broken line in FIG. 4 represent the solution $(\eta/\sqrt{\alpha})\mathrm{sech}(\eta T)$ for a soliton having the same pulse width. That is, the solid line in FIG. 4 shows variation in the value of $f(\gamma,\alpha,K_1)$ with $\gamma$ where $K_1=1$, $K_2=-0.159$, and $\alpha=0.5$, while the broken line in FIG. 4 shows variation in the soliton solution with $\gamma$.

As shown in FIG. 4, for $K_1=1$ the soliton requires about 2.9 times the power of the quasi-soliton represented by $f(\gamma;\alpha,K_1)$. As $K_1$ increases, the width of the potential function decreases and the pulse width becomes shorter for a given amplitude, and the function f approaches the Gaussian shape.

When $K_1=0$, $f=(\eta/\sqrt{\alpha})\mathrm{sech}(\eta T)$ (complete nonlinear regime); i.e. a soliton solution, is given. In contrast, when $\alpha=0$, the fundamental eigen function of the harmonic oscillator is represented by $f=\exp[-(\sqrt{K_1})\gamma^2/2]$; i.e., a linear solution is given.

The corresponding dispersion profile of the fiber can be obtained from Eqs. (6) and (8):

$$C = d_e/d_e^2, \quad (12)$$

$$d_e \frac{d^2 d_e}{dZ'^2} - \left(\frac{dd_e}{dZ'}\right)^2 = K_1. \quad (13)$$

On solving Eq.(13) for the initial condition $d_e(0)=1$, a dispersion profile can be obtained as follows:

$$d_e(Z') = \cosh(\delta Z') + \frac{C(0)}{\delta}\sinh(\delta Z'),\ \delta = \sqrt{K_1 + C(0)^2}, \quad (14)$$

and $$d(Z) = d_e(Z')\exp(-2\Gamma Z). \quad (15)$$

Figure 5:
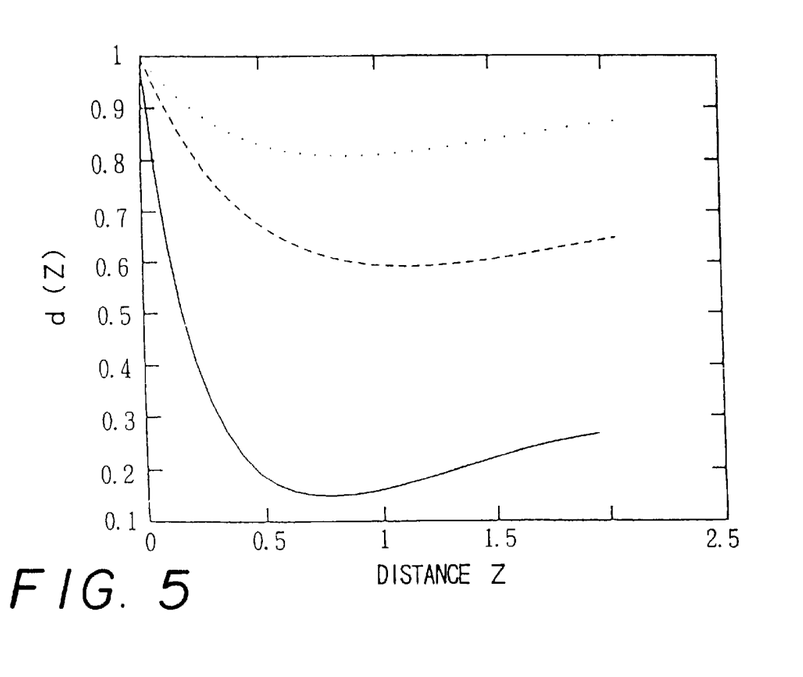
FIG. 5 is a plot related to the embodiment of the present invention, showing a dispersion profile for different C(0) and Γ.

FIG. 5 shows the dispersion profile for different values of $C(0)$ and $\Gamma$. The solid line represents the dispersion profile for the case where $C(0)=-3.9$ and $\Gamma=0.36$, the broken line represents the dispersion profile for the case where $C(0)=-1.2$ and $\Gamma=0.18$, and the dotted line represents the dispersion profile for the case where $C(0)=-0.3$ and $\Gamma=0.18$.

As is apparent from FIG. 5, for relatively low chirps, the dispersion profile is nearly constant. This indicates that the stationary mode f might propagate in a constant dispersion fiber with only slight distortion.

When the chirp $C(0)$ and $K_1$ becomes zero, the soliton solution can be obtained from Eq.(11) and the dispersion profile becomes $\exp(-2\Gamma Z)$ as expected.

Using Eqs.(6), (8) and (12), the fundamental solution of Eq.(1) can be written as $$q(T, Z) = \frac{\exp(-\Gamma Z)}{\sqrt{d_e(Z')}} f(T/d_e)\exp[iC(Z')T^2/2 + i\beta(Z')], \quad (16)$$

where $$C(Z') = d_e/d_e^2,\ \beta(Z') = K_2 \int_0^{Z'} p(s)ds, \quad (17)$$

with $d_e(Z')$ given by Eq.(14). When $K_1=0$, the solution given by Eq.(16) reduces to that derived in Ref. 6, $$q(T, Z) = \frac{\exp(-\Gamma Z)}{\sqrt{d_e(Z')}} \mathrm{sech}(T/d_e)\exp[iC(Z')T^2/2 + i\beta(Z')], \quad (18)$$

where $$d_e(Z') = \exp[C(0)Z']. \quad (19)$$

Although the solution given by Eq.(18) is useful for soliton compression, it does not serve the purpose of the present invention, as the chirp cannot reverse in sign. In addition, $K_1=0$ implies a completely nonlinear regime.

From Eqs.(12) and (14), we see that the sign of chirp is reversed at $Z=Z_c$ given by $$Z'(Z_c) = \frac{1}{\delta}\tanh^{-1}\left[\frac{-C(0)}{\delta}\right], \quad (20)$$

and maximum compression occurs at this distance. For $Z>Z_c$, the chirp is the negative of the initial chirp.

The next step is to reverse the chirp in order to restore the launched pulse having the same initial chirp.

This can be accomplished by the use of a fiber element (dispersion compensation fiber) or a grating to provide a normal dispersion. The effect of grated fiber having dispersion $d_N$ and placed after the transmission fiber is obtained by multiplying the signal by the transfer function $h(\Omega)$ such that $$q(T,Z_a) = \int_{-\infty}^{\infty} h(\Omega)\bar{q}(\Omega,Z_1)\exp[i\Omega T]d\Omega, \quad (21)$$

where $$h(\Omega) = \exp(i\Omega^2 g/2),\ g = (Z_a - Z_1)d_N, \quad (22)$$

and $\bar{q}(\Omega,Z_1)$ is the Fourier transform of $q(T,Z_1)$ given by Eq.(16).

It is assumed herein that g is real, but in the general case it can be complex when grating and filtering are properly used in combination. When the chirp $C(Z'(Z_1))$ is large, Eq.(21) can be approximately evaluated through the use of the stationary phase method in order to yield $$q(T, Z_a) \approx \exp[-\Gamma Z_a]\sqrt{\omega}\, f(\omega T)\exp[iC_2 T^2/2 + i\beta(Z'(Zl))], \quad (23)$$

where $$\omega = 1/d_1[1 - gC_1],\text{ and } C_2 = C_1/[1 - gC_1], \quad (24)$$

with $d_e(Z'(Z_1))$ $d_1$ and $C(Z'(Z_1))$ $C_1$.

The initial pulsewidth and chirp can be obtained only when $$d_1[1-gC_1]=\pm 1, \quad (25)$$

and $$C_1 d_1 = \pm C(0). \quad (26)$$

The solution of Eqs.(25) and (26) yields the approximate value of g. The exact value of g for chirp cancellation can be obtained by numerically evaluating the integral in Eq.(21).

Accordingly, there has been carried out a numerical simulation of Eq.(1) with the following parameters: fiber dispersion (at Z=0) is −0.5 ps$^2$/km, wavelength=1.55 μm, effective cross sectional area of the fiber=25 μm$^2$, nonlinear coefficient n$_2$=3.18×10$^{-16}$ cm$^2$/W, fiber loss=0.2 dB/km, amplifier interval=30 km, integrated dispersion g of the grating=3.74 ps$^2$. There were employed a suitable time scale to and length scale z$_0$ such that t/t$_0$=T and z/z$_0$=Z, where t and z are real time and distance respectively. Assuming t$_0$=2.83 ps, z$_0$ becomes 16 km. The pulse width of the quasi-soliton (FIG. 2) is found to be 1.46 t$_0$ and the peak power to be 6 mW.

Figure 6A:
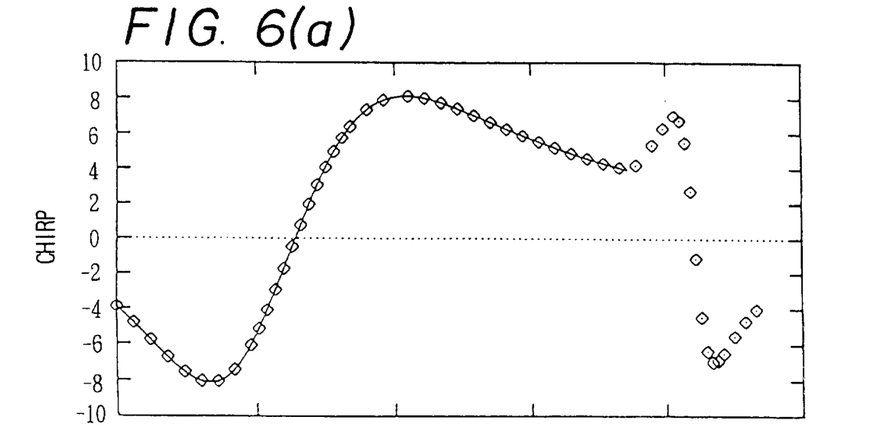
FIG. 6 is a plot related to the embodiment of the present invention, showing a theoretical value (solid line) and the result of a simulation (square marks) performed for one cycle.
Figure 6B:
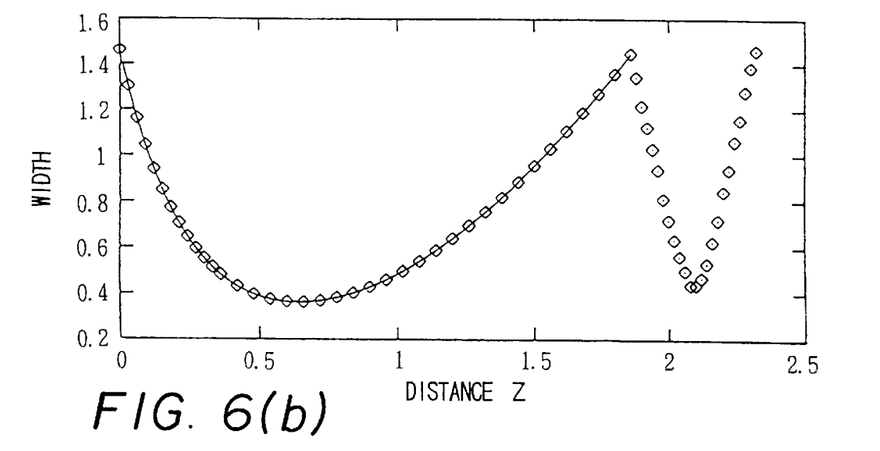

FIG. 6 shows the theoretical value (solid line) and simulation results (squares) for a unit cell (cycle). The chirp is computed numerically using the following formula.

$$C = -i/2 \int Tq''q_T dT \Big/ \int T^2|q|^2 dT + c.c. \quad (27)$$

At the input side, the pulse is pre-chirped such that it undergoes compression.

The nonlinearity induced chirp also enhances compression. However, after some distance, the fiber dispersion dominates and the chirp reverses in sign at Z=Z$_c$.

Thereafter, the pulse begins to expand. There exists a length Z$_1$ such that the initial pulse width is restored but the sign of the chirp reversed. The grating reverses the sign of the chirp again so that the initial chirp is recovered.

The simulation was carried out over a length of 3000 km and it was found that the stationary mode propagates with no distortion. The chirp C was computed at every amplifier position and it was found that even after being propagated a length of 3000 km, the chirp is the same as the initial chirp, indicating that maximum transmission distance is limited only by amplifier noise and higher order dispersion effects.

FIG. 7 shows the results of a simulation in which interaction between two quasi-solitons was simulated. The result of a simulation on transmission of 4.14 ps quasi-solitons separated by 11 ps demonstrates that the two solitons can propagate over a distance of 3000 km with almost no interaction.

In contrast, it is known that when two solitons having the same peak power (6 mW) and separated by 11 ps collide after 80 km. The reduced interaction in the case of quasi-solitons is attributed to their Gaussian-like tails and rapid phase rotation.

Ref. 5 also shows the large reduction in soliton interaction by initial chirping.

It is to be noted that, because of the chirp, the energy required to form a quasi-soliton is less than that required to form a soliton having the same pulse width corresponding to the same local dispersion, and the energy of the quasi-soliton is higher than that of a soliton corresponding to the average dispersion, defined by $$\left[g - \int_0^{Z_1} d(z)dz\right]\Big/za\right]. \quad (28)$$

This result is similar to the stable mode of Ref. 4. However, the results of the simulation indicate that interaction between solitons and generation of dispersive wave can be suppressed more effectively as compared with the case where the dispersion of a fiber is simply changed stepwise in positive and negative as in Ref. 4. The functional form can vary from secant- hyperbolic to Gaussian, depending on the input power.

The results of the simulation show that quasi-solitons having a sort pulse width (=4 ps) can be transmitted over ultra long distance (=180 z$_0$) through use of relatively low power.

In the present invention, the chirped stationary solution of the NLS equation is derived in order to obtain a novel dispersion profile that supports the stationary mode.

As described above, combination of programmed chirp (variation in frequency with time) and dispersion profile produces soliton-like nonlinear pulses having a stationary structure (quasi-solitons).

Due to reduced interaction, the quasi-solitons have more attractive properties and small peak power than do solitons and allow 100 Gbit/sec transmission over 180 dispersion distance with reasonable power.

The fiber having the dispersion profile d (Z) as shown in FIG. 5 may be replaced with a fiber whose dispersion profile varies stepwise in a way approximately following the dispersion profile of FIG. 5.

The present invention is not limited to the above-described embodiments. Numerous modifications and variations of the present invention are possible in light of the spirit of the present invention, and they are not excluded from the scope of the present invention.

What is claimed is:

1. An ultra-high speed light transmission method making use of quasi-solitons in a fiber, said method comprising the steps of:
   (a) transmitting stationary light pulses with a chirp in an optical fiber that has a dispersion profile such that an equivalent potential produced by the chirp reinforces the soliton effect; and
   (b) reversing the sign of the chirp at a position where the effect of the chirp becomes weak and the sign of the chirp reverses;
   (c) said reversion of the sign being performed, through use of a dispersion compensation fiber or fiber grating connected to the fiber, in order to recover the initial chirp; and
   (d) the dispersion profile of each of the fibers being properly controlled in order to produce stationary quasi-solitons having a stable pulse shape.

2. An ultra-high speed light transmission method according to claim 1, wherein the dispersion of each fiber is properly changed along the transmission direction such that each chirped soliton exhibits a stable periodical behavior along the transmission direction.

3. An ultra-high speed light transmission method according to claim 1, wherein at least one of the fibers has a dispersion profile that varies stepwise.

4. An ultra-high speed light transmission method making use of quasi-solitons in a fiber, said method comprising the steps of:
   (a) transmitting stationary light pulses with a chirp in an optical fiber whose dispersion profile d$_e$(Z') is given by the equation:

$$d_e(Z') = \cosh(\delta Z') + \frac{C(0)}{\delta}\sinh(\delta Z'),$$

wherein $\delta = \sqrt{K_1 + C(0)^2}$, $C(0)$ is a chirp value, $Z'$ is position along the fiber, and $K_1$ is a constant, or approximately thereof for a given value of the chirp such that an equivalent potential that traps the pulse reinforces the soliton effect; and (b) reversing the sign of the chirp at a position where the pulse width regains the original value by means of a dispersion compensation fiber or fiber grating connected to the fiber, in order to recover the initial chirp; and (c) the dispersion profile of each of the fibers being properly controlled in order to produce stationary quasi-solitons having a stable pulse shape.

* * * * *

UNITED STATES PATENT AND TRADEMARK OFFICE
CERTIFICATE OF CORRECTION

PATENT NO.   : 6,122,088
DATED        : September 19, 2000
INVENTOR(S)  : Hasegawa It is certified that error appears in the above-identified patent and that said Letters Patent is hereby corrected as shown below:

Title page,
Under heading "OTHER PUBLICATIONS": "Opt. Comm. 117, 65 (1995), Belanger et al" should read -- Opt. Comm. 117, 56 (1995) Belanger et al --.

Column 4,
Formula 2, at line 15 which reads:

$$i\frac{du}{dZ'} + \frac{d_e(Z')}{2}\frac{\partial^2 q}{\partial T_2} + \alpha|u|^2 u = 0,$$

should read --

$$i\frac{\partial u}{\partial Z'} + \frac{d_e(Z')}{2}\frac{\partial^2 u}{\partial T^2} + \alpha|u|^2 u = 0,$$

--

Line 48, "$d_e p^2 p$" should read -- $d_e p^2 \alpha p$ --.

Column 7,
Line 19, "to" should read -- $t_o$ --.

Signed and Sealed this

Twenty-fifth Day of December, 2001

Attest:

Attesting Officer

JAMES E. ROGAN
*Director of the United States Patent and Trademark Office*